US011072885B2

(12) United States Patent
Knaup

(10) Patent No.: US 11,072,885 B2
(45) Date of Patent: Jul. 27, 2021

(54) FLUORINE-FREE WATER-REPELLENT COMPOSITION

(71) Applicant: ARCHROMA IP GMBH, Reinach (CH)

(72) Inventor: Wolfgang Knaup, Burgkirchen (DE)

(73) Assignee: Archroma IP GmbH, Reinach (CH)

( * ) Notice: Subject to any disclaimer, the term of this patent is extended or adjusted under 35 U.S.C. 154(b) by 567 days.

(21) Appl. No.: 15/320,698

(22) PCT Filed: Jul. 3, 2015

(86) PCT No.: PCT/EP2015/001372
§ 371 (c)(1),
(2) Date: Dec. 20, 2016

(87) PCT Pub. No.: WO2016/000830
PCT Pub. Date: Jan. 7, 2016

(65) Prior Publication Data
US 2017/0204558 A1    Jul. 20, 2017

(30) Foreign Application Priority Data
Jul. 4, 2014 (EP) .................................... 14002305

(51) Int. Cl.
D06M 13/02 (2006.01)
C09D 5/00 (2006.01)
C09D 133/12 (2006.01)
C09D 133/08 (2006.01)
C09D 133/06 (2006.01)
D06M 15/263 (2006.01)
C08L 33/10 (2006.01)
C08F 220/18 (2006.01)
C08F 220/24 (2006.01)
C08L 33/16 (2006.01)
D06M 15/277 (2006.01)
C08F 2/44 (2006.01)
D06M 13/224 (2006.01)
D06M 15/248 (2006.01)
(Continued)

(52) U.S. Cl.
CPC ............. D06M 13/02 (2013.01); C08F 2/44 (2013.01); C08F 220/18 (2013.01); C08F 220/24 (2013.01); C08L 33/10 (2013.01); C08L 33/16 (2013.01); C08L 91/06 (2013.01); C09D 4/00 (2013.01); C09D 5/00 (2013.01); C09D 7/63 (2018.01); C09D 133/066 (2013.01); C09D 133/068 (2013.01); C09D 133/08 (2013.01); C09D 133/12 (2013.01); C09D 133/16 (2013.01); C09D 191/06 (2013.01); D06M 13/224 (2013.01); D06M 15/248 (2013.01); D06M 15/263 (2013.01); D06M 15/273 (2013.01); D06M 15/277 (2013.01); D06M 15/29 (2013.01); C08F 220/1818 (2020.02); C08K 5/01 (2013.01); C08L 2203/12 (2013.01); C08L 2205/025 (2013.01); D06M 2101/06 (2013.01); D06M 2101/32 (2013.01); D06M 2200/01 (2013.01); D06M 2200/11 (2013.01); D06M 2200/12 (2013.01)

(58) Field of Classification Search
None
See application file for complete search history.

(56) References Cited

U.S. PATENT DOCUMENTS 5,057,577 A * 10/1991 Matsuo ............... D06M 15/277
427/412
6,379,751 B1 * 4/2002 Schafer ................. C08G 18/12
427/389

(Continued)

FOREIGN PATENT DOCUMENTS

CN        1582352 A     2/2005
CN      101283007 A    10/2008
(Continued)

OTHER PUBLICATIONS

Encyclopedia Britannica (https://www.britannica.com/science/paraffin-wax, page visited on Dec. 4, 2018).. (Year: 2018).*
(Continued)

Primary Examiner — Shawn McKinnon
(74) Attorney, Agent, or Firm — McBee Moore & Vanik IP, LLC

(57) ABSTRACT

Composition, comprising at least components (A) and (B) and optionally at least one of components (C) to (E):
(A) polyacrylate obtained in the polymerisation of components
  (M1) $CH_2=CR^3COO-R^1$ with
  (M2) $CH_2=CR^3COO-R^2$ and optionally
  (M3) $CH_2=CR^3-X-R^4$
(B) wax
(C) blocked isocyanate
(D) organic polysiloxane;
(E) melamine resin;
wherein
$R^1$ is a residue containing from 1 to 8 carbon atoms;
$R^2$ is a residue containing from 9 to 40 carbon atoms;
$R^3$=H, $CH_3$, $C_2H_5$;
X=COO, CONH
$R^4$=glycidyl or $CH_2(CH_2)_n-OR^5$,
  wherein
  n is an integer in the range of from 1-10 and
  $R^5$ is H or a residue containing from 1 to 6 carbon atoms;
and wherein the composition is based on water and/or an organic solvent and is fluorine-free.

19 Claims, No Drawings

(51) Int. Cl.
  *D06M 15/273* (2006.01)
  *D06M 15/29* (2006.01)
  *C09D 7/63* (2018.01)
  *C08L 91/06* (2006.01)
  *C09D 4/00* (2006.01)
  *C09D 133/16* (2006.01)
  *C09D 191/06* (2006.01)
  *C08K 5/01* (2006.01)
  *D06M 101/06* (2006.01)
  *D06M 101/32* (2006.01)

(56) References Cited

U.S. PATENT DOCUMENTS

2005/0090608 A1* 4/2005 Audenaert ........... C08G 18/283
  524/591
2006/0005317 A1* 1/2006 Hashimoto ........... D06M 13/02
  8/115.51
2007/0009663 A1 1/2007 Wang et al.

FOREIGN PATENT DOCUMENTS

| | | | |
|---|---|---|---|
| CN | 102333915 A | | 1/2012 |
| CN | 102675527 | * | 9/2012 |
| CN | 102675527 A | | 9/2012 |
| CN | 103572602 A | | 2/2014 |
| EP | 2233633 | * | 9/2010 |
| EP | 2411575 A1 | | 2/2012 |
| JP | S50-26851 A | | 3/1975 |
| JP | H03-292352 A | | 12/1991 |
| JP | H07-316434 A | | 12/1995 |
| JP | H08-239407 A | | 9/1996 |
| JP | 2000129573 A | | 5/2000 |
| JP | 2000-239656 A | | 9/2000 |
| JP | 2002-531727 A | | 9/2002 |
| JP | 2006328624 A | | 12/2006 |
| JP | 2009-500494 A | | 1/2009 |
| JP | 2012522062 A | | 9/2012 |
| TW | 200916541 A | | 4/2009 |
| WO | 00/34583 A1 | | 6/2000 |
| WO | 2007/008416 A1 | | 1/2007 |
| WO | 2009/012292 A1 | | 1/2009 |
| WO | 2010/115496 A1 | | 10/2010 |

OTHER PUBLICATIONS

Machine translation of CN102675527, Weiping et al. (Year: 2012).*
International Search Report of International Patent Application No. PCT/EP2015/001372 dated Aug. 31, 2015.

* cited by examiner

FLUORINE-FREE WATER-REPELLENT COMPOSITION

CROSS-REFERENCE TO RELATED APPLICATIONS

This application is a National Stage entry of International Application No. PCT/EP2015/001372, filed Jul. 3, 2015, which claims priority to European Patent Application No. 14002305.2, filed Jul. 4, 2014.

FIELD OF THE INVENTION

The invention relates to a composition containing a polyacrylate made from two different (meth)acrylic acid esters, and paraffin wax, and optionally further ingredients selected from blocked isocyanates, polysiloxanes and melamine resins, to a method of making such a composition, to a method of treating a substrate such as a textile with such composition in order to impart hydrophobic properties, i.e. water-repellent properties to such substrate, and said treated substrate as such. Said composition is provided as an aqueous dispersion which is fluorine-free.

BACKGROUND OF THE INVENTION

It is known to treat textile fabrics such as wovens, knits or nonwovens with aqueous dispersions to provide them with desirable properties.

Such a desired property is, for example, a water-repellent effect, i.e. a hydrophobic effect. In order to obtain water-repellent properties for textiles, frequently aqueous dispersions of fluorine-containing products are used. However, such fluorine-containing dispersions can entail environmentally harmful influences.

In order to avoid the use of such environmentally harmful substances, it has been suggested to employ fluorine-free compositions for providing hydrophobic properties to substrates such as textiles.

DE 10 2013 209 170 relates to a composition comprising at least a silicon polymer and a wax.

EP 2 411 575 relates to an aqueous dispersions with no fluorine or N-methylol compounds, comprising a copolymer of an alkyl (meth)acrylate, styrene or alpha-methylstyrene, vinylidene chloride and/or vinyl chloride and optionally 3-chloro-2-hydroxypropyl and/or glycidyl (meth)acrylate, paraffin wax with a melting range of 58-80° C., and dispersant(s), preferably a cationic dispersant or a mixture of cationic and non-ionic dispersant.

EP 1 899 391 relates to a polymer extender composition comprising copolymerized monomers, wherein the monomers are selected from various (meth)acrylates, (meth)acrylic acid amide, vinylidene chloride, vinyl chloride, vinyl acetate, or a mixture thereof.

EP 1 485 533 relates to preparations based on water and/or organic solvents and use thereof as coating on textile fabrics. Said preparations comprise a hydrophobic component based on wax, and a reaction product produced by reaction of a component with a non-protected or partially-protected di-, tri- or polyisocyanate.

EP 2 152 957 relates to a fluorine-free composition based on water and/or organic solvents and the use thereof in textile applications, based on a reaction product produced by reaction of a component with a non-protected or partially-protected di-,tri- or polyisocyanate, and an organopolysiloxane containing $C_8$-$C_{28}$-alkyl groups.

EP 1 424 433 relates to aqueous systems comprising n-paraffin and acrylic polymers based on $C_{1-12}$ esters of acrylic or methacrylic acids.

OBJECTS OF THE INVENTION

It is an object of the invention to provide a composition which imparts durable water-repellent properties to substrates such as textiles, and which is not environmentally harmful.

SUMMARY OF THE INVENTION

This object is achieved with a fluorine-free composition comprising at least components (A) and (B), wherein component (A) is a polyacrylate made by polymerising two different (meth)acrylates, and component (B) is a wax, and water and/or an organic solvent.

Accordingly, in a first aspect, the invention relates to a composition, comprising at least components (A) and (B) and optionally at least one of components (C) to (E):
(A) polyacrylate obtained in the polymerisation of components
  (M1) $CH_2=CR^3COO-R^1$ with
  (M2) $CH_2=CR^3COO-R^2$ and optionally
  (M3) $CH_2=CR^3-X-R^4$
(B) wax
(C) blocked isocyanate
(D) organic polysiloxane;
(E) melamine resin;
wherein
$R^1$ is the alcohol moiety in monomer (M1) containing from 1 to 8 carbon atoms;
$R^2$ is the alcohol moiety in monomer (M2) containing from 9 to 40 carbon atoms;
$R^3$ is H, $CH_3$, or $C_2H_5$;
X is COO or CONH;
$R^4$ is glycidyl or $CH_2(CH_2)_n-OR^5$,
wherein
  n is an integer in the range of from 1-10 and
  $R^5$ is H or a residue containing from 1 to 6 carbon atoms;
and wherein the composition is based on water and/or an organic solvent and is fluorine-free.

In one embodiment, $R^1$ contains from 1 to 6 carbon atoms and $R^2$ contains from 12 to 40 carbon atoms.

In a further embodiment, $R^1$ is branched or unbranched or cyclic $C_1$-$C_6$ alkyl and $R^2$ is branched or unbranched or cyclic $C_{12}$-$C_{40}$ alkyl.

In a further embodiment, $R^1$ is selected from one or more of the group consisting of methyl, ethyl, n-propyl, iso-propyl, n-butyl, iso-butyl, sec-butyl, tert-butyl, n-pentyl and isomers thereof, n-hexyl and isomers thereof, cyclopropyl, cyclobutyl, cyclopentyl, cyclohexyl; and $R^2$ is selected from one or more of the group consisting of n-dodecyl (lauryl) and isomers thereof, n-tridecyl and isomers thereof, n-tetradecyl (myristyl) and isomers thereof, n-pentadecyl and isomers thereof, n-hexadecyl (cetyl) and isomers thereof, n-heptadecyl and isomers thereof, n-octadecyl (stearyl) and isomers thereof, n-nonadecyl and isomers thereof, n-eicosyl and isomers thereof, n-heneicosyl and isomers thereof, n-docosyl (behenyl) and isomers thereof, n-tricosyl and isomers thereof, n-tetracosyl and isomers thereof, n-pentacosyl and isomers thereof, n-hexacosyl (ceryl) and isomers thereof, n-heptacosyl and isomers thereof, n-octacosyl and isomers thereof, n-nonacosyl and isomers thereof, n-triacontyl (myricyl) and isomers thereof.

In a further embodiment, (A) is obtained in the polymerization of 5 to 45% by weight of monomer (M1) with 55 to 95% by weight of monomer (M2) based on the total amount of (A) (=100% by weight); or 5 to 44% by weight of monomer (M1) with 55 to 94% by weight of monomer (M2) and 0.1 to 20% by weight of (M3) based on the total amount of (A) (=100% by weight).

In a further embodiment, the wax has a melting point in the range of from 50 to 130° C. or 60 to 90° C.

In a further embodiment, the wax is a paraffin wax.

In a further embodiment, the composition comprises from
5-90% by weight of (A);
5-90% by weight of (B);
0-40% by weight of (C);
0-40% by weight of (D);
0-40% by weight of (E);
0.1-90% by weight of water and/or an organic solvent;
based on the total amount of the composition (=100% by weight).

In a further embodiment, the composition additionally comprises a component comprising an amphoteric structure such as a betaine and/or an amine N-oxide (Component (F)).

In one embodiment, said composition comprises from
5-90% by weight of (A);
5-90% by weight of (B);
0-40% by weight of (C);
0-40% by weight of (D);
0-40% by weight of (E);
0.1-90% by weight of water and/or an organic solvent;
0.1 to 3% by weight of a component comprising an amphoteric structure [component (F)];
based on the total amount of the composition (=100% by weight).

In a further embodiment, the composition does not contain compounds comprising N-methylol groups or chlorine groups.

In a second aspect, the invention relates to a method of making a composition as defined in any one of the preceding claims, comprising at least steps (C1) to (C2):
(C1) homogenizing a mixture comprising at least monomers (M1) and (M2), and component (B), and water and/or an organic solvent;
(C2) polymerizing the mixture obtained in step (C1).

In a third aspect, the invention relates to a method of treating a substrate, comprising at least step (S1):
(S1) contacting a substrate with the composition defined in the first aspect or any embodiment disclosed therein, or contacting a substrate with the composition made according to the method defined in the second aspect.

In one embodiment, the substrate is a textile, fiber, fabric, paper, nonwoven, leather, or a combination of two or more thereof.

In one embodiment, the invention relates to the use of a composition as defined in the first aspect in or as a finishing for any textile in the form of a linear formation such as thread and yarn, in the form of a planar formation such as fabric, knitted fabric, knotted fabric, non-woven fabric, felts, or in the form of a spatial formation such as hose and outwear for women, men and children.

In a further embodiment, the invention relates to the use of a wax which comprises or consists of n-paraffins in an amount of from 75 to 95% by weight and isoparaffins, and/or cycloparaffins and/or aromatic compounds in an amount of from 5 to 25% by weight, based on the total amount of the wax (=100% by weight), wherein the n-paraffins have from 20 to 60 carbon atoms, preferably wherein the n-paraffins have a molecular weight of from 300 to 600, in or as a finishing for any textile in the form of a linear formation such as thread and yarn, in the form of a planar formation such as fabric, knitted fabric, knotted fabric, non-woven fabric, felt, or in the form of a spatial formation such as hose and outwear for women, men and children.

In a fourth aspect, the invention relates to a substrate, comprising at least components (A) and (B) as defined in the first aspect.

In one embodiment, the substrate is or has been treated by the method as defined in the third aspect.

In one embodiment, the substrate is in the form of a linear formation such as threads and yarns, in the form of a planar formation such as fabric, knitted fabric, knotted fabric, non-woven fabric, felt, or in the form of a spatial formation such as hoses and outwear for women, men and children; or is a textile, fiber, fabric, paper, nonwoven, leather, or a combination of two or more thereof.

DETAILED DESCRIPTION OF THE INVENTION

First Aspect: Composition According to the Invention

In a first aspect, the invention relates to a composition comprising at least components (A) and (B) and optionally at least one of components (C) to (E):
(A) a polyacrylate obtained in the polymerisation of monomers
 (M1) $CH_2=CR^3COO-R^1$ with
 (M2) $CH_2=CR^3COO-R^2$ and optionally
 (M3) $CH_2=CR^3-X-R^4$;
(B) a wax;
(C) a blocked isocyanate;
(D) an organic polysiloxane;
(E) a melamine resin;
wherein
$R^1$ is a residue containing from 1 to 8 carbon atoms;
$R^2$ is a residue containing from 9 to 40 carbon atoms;
$R^3$ is H, $CH_3$, or $C_2H_5$;
X is COO or CONK
$R^4$ is glycidyl or $CH_2(CH_2)_n-OR^5$,
 wherein
 n is an integer in the range of from 1-10 and
 $R^5$ is H or a residue containing from 1 to 6 carbon atoms;
and wherein the composition is based on water and/or an organic solvent and is fluorine-free.

Component (A)

Component (A) is the reaction product obtained in a polymerization reaction of monomer (M1) with monomer (M2). Optionally, a monomer (M3) may be additionally employed to monomers (M1) and (M2).

The term "a polyacrylate obtained in the polymerisation of monomer (M1) with monomer (M2) and optionally monomer (M3)" means that said polyacrylate [component (A)] comprises or consists of moieties derived from monomer (M1) and monomer (M2), and optionally monomer (M3) (in the following, all terms in quotation marks are defined in the meaning of the invention).

Monomers (M1) and (M2) are acrylic acid esters which are different from one another. The term "different from one another" means that (M1) and (M2) differ at least in the ester moiety of the monomers.

Monomer (M1)

According to the invention, monomer (M1) is an acrylic acid ester $CH_2=CR^3COO-R^1$ wherein $R^1$ represents a residue containing from 1 to 8 carbon atoms. $R^3$ is selected from the group consisting of H, $CH_3$, or $C_2H_6$.

The term "residue" as used in the definition of monomer (M1) denotes the alcohol moiety of the ester or monomer (M1).

In one embodiment, $R^1$ is a branched or unbranched or cyclic $C_1$-$C_8$ alkyl group that may be saturated or unsaturated.

Preferably, $R^1$ is selected from the group consisting of methyl, ethyl, n-propyl, iso-propyl, n-butyl, sec-butyl, iso-butyl, tert-butyl, n-pentyl and isomers thereof, n-hexyl and isomers thereof, n-heptyl and isomers thereof, n-octyl and isomers thereof, cyclopropyl, cyclobutyl, cyclopentyl, cyclohexyl, cycloheptyl and cyclooctyl.

Mixtures of different monomers (M1) may also be employed.

The term "isomer" in connection with $R^1$ encompasses positional isomers.

In one embodiment, $R^1$ represents a residue, i.e. the alcohol moiety of the ester, containing from 1 to 6 carbon atoms.

In one embodiment, $R^1$ is a branched or unbranched or cyclic $C_1$-$C_6$ alkyl group that may be saturated or unsaturated.

Preferably, $R^1$ is selected from one or more of the group consisting of methyl, ethyl, n-propyl, iso-propyl, n-butyl, iso-butyl, sec-butyl, tert-butyl, n-pentyl and isomers thereof, n-hexyl and isomers thereof, cyclopropyl, cyclobutyl, cyclopentyl, cyclohexyl.

Monomer (M2)

According to the invention, monomer (M2) is an acrylic acid ester $CH_2=CR^3COO-R^2$ wherein $R^2$ represents a residue, i.e. the alcohol moiety of the ester, containing from 9 to 40 carbon atoms. $R^3$ is selected from the group consisting of H, $CH_3$, or $C_2H_5$.

The term "residue" as used in the definition of monomer (M2) denotes the alcohol moiety of the ester or monomer (M2).

In one embodiment, $R^2$ is a branched or unbranched or cyclic $C_9$-$C_{40}$ alkyl group that may be saturated or unsaturated.

Preferably, $R^2$ is selected form the group consisting of n-nonyl and isomers thereof, n-decyl and isomers thereof, n-undecyl and isomers therof, n-dodecyl (lauryl) and isomers thereof, n-tridecyl and isomers thereof, n-tetradecyl (myristyl) and isomers thereof, n-pentadecyl and isomers thereof, n-hexadecyl (cetyl) and isomers thereof, n-heptadecyl and isomers thereof, n-octadecyl (stearyl) and isomers thereof, n-nonadecyl and isomers thereof, n-eicosyl and isomers thereof, n-heneicosyl and isomers therof, n-docosyl (behenyl) and isomers thereof, n-tricosyl and isomers thereof, n-tetracosyl and isomers thereof, n-pentacosyl and isomers thereof, n-hexacosyl (ceryl) and isomers therof, n-heptacosyl and isomers thereof, n-octacosyl and isomers therof, n-nonacosyl and isomers thereof, n-triacontyl (myricyl) and isomers thereof.

Mixtures of different monomers (M2) may also be employed.

The term "isomers" in connection with $R^2$ encompasses positional isomers.

In one embodiment, $R^2$ represents a residue, i.e. the alcohol moiety of the ester, containing from 12 to 40 carbon atoms.

In one embodiment, $R^2$ is a branched or unbranched or cyclic $C_{12}$-$C_{40}$ alkyl group that may be saturated or unsaturated.

Preferably, $R^2$ is selected from one or more of the group consisting of n-dodecyl (lauryl) and isomers thereof, n-tridecyl and isomers thereof, n-tetradecyl (myristyl) and isomers thereof, n-pentadecyl and isomers thereof, n-hexadecyl (cetyl) and isomers thereof, n-heptadecyl and isomers thereof, n-octadecyl (stearyl) and isomers thereof, n-nonadecyl and isomers thereof, n-eicosyl and isomers thereof, n-heneicosyl and isomers thereof, n-docosyl (behenyl) and isomers thereof, n-tricosyl and isomers thereof, n-tetracosyl and isomers thereof, n-pentacosyl and isomers thereof, n-hexacosyl (ceryl) and isomers thereof, n-heptacosyl and isomers thereof, n-octacosyl and isomers thereof, n-nonacosyl and isomers thereof, n-triacontyl (myricyl) and isomers thereof.

In one embodiment, $R^1$ of monomer (M1) is a branched or unbranched or cyclic $C_1$-$C_6$ alkyl group and $R^2$ is a branched or unbranched or cyclic $C_{12}$-$C_{40}$ alkyl group, which may be saturated or unsaturated, respectively.

Preferably, $R^1$ is selected from one or more of the group consisting of methyl, ethyl, n-propyl, iso-propyl, n-butyl, iso-butyl, sec-butyl, tert-butyl, n-pentyl and isomers thereof, n-hexyl and isomers thereof, cyclopropyl, cyclobutyl, cyclopentyl, cyclohexyl, and $R^2$ is selected from the group consisting of n-dodecyl (lauryl) and isomers thereof, n-tridecyl and isomers thereof, n-tetradecyl (myristyl) and isomers thereof, n-pentadecyl and isomers thereof, n-hexadecyl (cetyl) and isomers thereof, n-heptadecyl and isomers thereof, n-octadecyl (stearyl) and isomers thereof, n-nonadecyl and isomers thereof, n-eicosyl and isomers thereof, n-heneicosyl and isomers thereof, n-docosyl (behenyl) and isomers thereof, n-tricosyl and isomers thereof, n-tetracosyl and isomers thereof, n-pentacosyl and isomers thereof, n-hexacosyl (ceryl) and isomers thereof, n-heptacosyl and isomers thereof, n-octacosyl and isomers thereof, n-nonacosyl and isomers thereof, n-triacontyl (myricyl) and isomers thereof.

In one embodiment, $R^1$ of monomer (M1) is a branched or unbranched or cyclic $C_1$-$C_5$ alkyl group and $R^2$ is a branched or unbranched or cyclic $C_{14}$-$C_{40}$ alkyl group, which may be saturated or unsaturated, respectively.

Preferably, $R^1$ is selected from one or more of the group consisting of methyl, ethyl, n-propyl, iso-propyl, n-butyl, iso-butyl, sec-butyl, tert-butyl, n-pentyl and isomers thereof, cyclopropyl, cyclobutyl, cyclopentyl, and $R^2$ is selected from the group consisting of n-tetradecyl (myristyl) and isomers thereof, n-pentadecyl and isomers thereof, n-hexadecyl (cetyl) and isomers thereof, n-heptadecyl and isomers thereof, n-octadecyl (stearyl) and isomers thereof, n-nonadecyl and isomers thereof, n-eicosyl and isomers thereof, n-heneicosyl and isomers therof, n-docosyl (behenyl) and isomers thereof, n-tricosyl and isomers thereof, n-tetracosyl and isomers thereof, n-pentacosyl and isomers thereof, n-hexacosyl (ceryl) and isomers therof, n-heptacosyl and isomers thereof, n-octacosyl and isomers therof, n-nonacosyl and isomers thereof, n-triacontyl (myricyl) and isomers thereof.

In the composition according to the invention, (A) is preferably obtained in the reaction of 5 to 45% by weight of monomer (M1) with 55 to 95% by weight of monomer (M2) based on the total amount of (A) (=100% by weight); or 20 to 40% by weight of monomer (M1) with 60 to 80% by weight of monomer (M2) based on the total amount of (A) (=100% by weight).

Monomer (M3)

According to the invention, the composition may be prepared in the presence of monomer (M3) which is monomer $CH_2=CR^3-X-R^4$.

In one embodiment, monomer (M3) is the glycidylester of an acrylic acid (X=COO and $R^4$=glycidyl).

In another embodiment, monomer (M3) is an ester of an acrylic acid, wherein the ester moiety bears an ether group (X=COO and $R^4$=$CH_2(CH_2)_n$—$OR^5$), wherein n is an integer in the range of from 1-10 and $R^5$ is H or a residue containing from 1 to 6 carbon atoms, preferably a branched or unbranched or cyclic alkyl. Preferably, n ranges from 1 to 4 and $R^5$ is H or a residue containing from 1 to 4 carbon atoms, preferably a branched or unbranched or cyclic alkyl.

In a preferred embodiment, if $R^4$=$CH_2(CH_2)_n$—$OR^5$, n is an integer in the range of from 1-4 and $R^5$ is H or n-butyl or iso-butyl.

In one embodiment, monomer (M3) is hydroxyethyl (meth)acrylate. The term "(meth)acrylate" encompasses both acrylate and methacrylate.

In another embodiment, monomer (M3) is the glycidylester of an acrylic acid amide (X=CONH and $R^4$=glycidyl).

In another embodiment, monomer (M3) is an ester of an acrylic acid amide, wherein the ester moiety bears an ether group (X=CONH and $R^4$=$CH_2(CH_2)_n$—$OR^5$ wherein n is an integer in the range of from 1-10 and $R^5$ is H or a residue containing from 1 to 6 carbon atoms, preferably branched or unbranched or cyclic alkyl. Preferably, n ranges from 1 to 4 and $R^5$ is H or a residue containing from 1 to 4 carbon atoms, preferably branched or unbranched or cyclic alkyl.

Mixtures of different monomers (M3) may also be employed.

In a preferred embodiment of the acrylic ester or the acrylic acid amide, if $R^4$=$CH_2(CH_2)_n$—$OR^5$, n is an integer in the range of from 1-4 and $R^5$ is H or n-butyl or iso-butyl.

Monomers (M3) bearing a glycidyl group may impart an increased adhesion to substrates bearing groups which may react with said glycidyl group such as hydroxyl or amino groups.

If monomer (M3) is present, (A) is preferably obtained in the reaction of 5 to 44% by weight of (M1) with 55 to 94% by weight of (M2) and 0.1 to 20% by weight of (M3) based on the total amount of (A) (=100% by weight).

Component (B)

According to the invention, component (B) is a wax, preferably a wax having hydrophobic properties, i.e. water-repellent properties.

Basically all known waxes may be employed in the composition according to the invention, i.e. natural waxes, chemically modified waxes and synthetic waxes, provided that they have hydrophobic properties. The term "wax" as used herein refers to the definition given in the publication "Römpp Chemielexikon, $9^{th}$ edition, vol. 6, page 4972.

Accordingly, natural waxes may be based on vegetable waxes, animal waxes mineral waxes, petrochemical waxes.

A vegetable waxes is e.g. carnauba wax, and an animal wax is e.g. bees wax.

A mineral wax is e.g. ceresin.

Petrochemical waxes may also be used such as petrolatum, paraffin waxes and microwaxes.

Chemically modified waxes are waxes such as montane ester waxes and sasol waxes.

Synthetic waxes are waxes based on polyalkylene and polyethylene glycol.

In a preferred embodiment, the wax is selected such to have a melting point in the range of from 50-100° C., more preferred 60 to 90° C., still more preferred 60 to 80° C. The melting point is determined according to ASTM D 938-05/DIN ISO 2207:1983.

Compositions according to the invention comprising waxes having a lower melting range than 50° C. are sometimes less suitable for imparting water-repellency to the textiles to be treated with the aqueous dispersions according to the invention. Waxes with a melting range higher above 100° C. may result in an acceptable water repellence and resistance to washing of the fabrics, but they may give rise to increased viscosity of the aqueous dispersions, so that these dispersions are technically less easy to handle. Therefore, basically, waxes having a melting point in the range of from 100 to 130° C. are also suitable in the composition according to the invention.

Thus, in general, the melting point of the wax according to component (B) may range from 50 to 130° C.

Preferably, the wax is a paraffin wax.

The paraffin wax is a mixture containing n-paraffins having from 20 to 60 carbon atoms as the main component and containing small amount of isoparaffins, and/or cycloparaffins and/or aromatic compounds. The n-paraffins preferably have a molecular weight of from 300 to 600.

The molecular weight is determined using gel-permeation chromatography. The distribution of n-paraffins, isoparaffins, cycloparaffins and aromatic compounds may be determined using $^{13}C$ NMR spectroscopy.

In one embodiment, the wax comprises or consists of n-paraffins in an amount of from 75 to 95% by weight and isoparaffins, and/or cycloparaffins and/or aromatic compounds in an amount of from 5 to 25% by weight, based on the total amount of the wax (=100% by weight).

E.g., a paraffin wax with a melting range of 68° C. to 74° C. is commercially available (CAS No. 8002-74-2).

Such suitable waxes are commercial available, e.g. Sasolwax 8775, Sasolwax 7040, Sasolwax 3971, Sasolwax 6805, or Sasolwax 2222.

Component (C) (Optional)

According to the invention, the composition may optionally contain a blocked or partially blocked isocyanate.

The term "blocked isocyanate" encompasses mono-, di- and polyisocyanates in which an isocyanate group has been reacted with blocking agents which upon heating release the isocyanate and the blocking agent. Suitable blocking agents are known in the art such as amines, amides, compounds having an active hydrogen atom or alcohols. If said heating is carried out in the presence of a compound having a functional group that can react with said isocyanate group, such as a hydroxyl or an amino group of a suitable substrate such as a fiber, an improved adhesion may result.

Accordingly, blocked isocyanates, in particular blocked polyisocyanates, present in the composition according to the invention, may impart an increased adhesion to substrates bearing groups such as amine or hydroxyl groups which may react with said blocked isocyanate.

Component (C) may be present in an amount of from 0-40% by weight based on the total amount of the composition (=100% by weight).

Such suitable blocked isocyanates are commercial available such like Arkophob DAN, Arkophob SR, and Cassurit FF (all Archroma); Phobol XAN (Huntsman) and Ruco-Guard WEB (Rudolf).

Component (D) (Optional)

According to the invention, the composition may optionally contain an organic polysiloxane resin.

The term "organic polysiloxane" encompasses a compound, in which at least a part of the silicon atoms bears alkyl or aryl groups which in turn may be substituted. The polysiloxane may be cyclic, linear or branched.

Any organic polysiloxane resin known in the art for providing water-repellency to a substrate may be used. Suitable products are e.g. known from DE 10 2013 209 170 and EP 2 152 957.

Component (D) may be present in an amount of from 0-40% by weight based on the total amount of the composition (=100% by weight).

Such polysiloxane formulations are commercial available such like Ceraperm SFC (Archroma), Powersoft FE 55 or Wacker Finish WR 210 (both Wacker Chemie, Germany).

Component (E) (Optional)

According to the invention, the composition may optionally contain a melamine resin.

Suitable melamine resins are e.g. resins in which the hydrogen atoms of the amino groups of the melamine moiety are partially or completely substituted by $CH_2O$-alkyl or $CH_2O_2C$-alkyl groups. Such products are known from U.S. Pat. No. 3,480,579.

Further suitable melamine resins are resins in which the hydrogen atoms of the amino groups of the melamine moiety are partially or completely substituted by saturated or unsaturated, linear, branched and/or cyclic hydrocarbons. Such products are e.g. known from DE 10 2013 209 170.

Component (D) may be present in an amount of from 0-40% by weight based on the total amount of the composition (=100% by weight).

Formulations that contain such suitable melamine resins are commercial available such like Cerol EX (Archroma) or Freepel 1225 (Emerald Performance Materials), or Phobotex JVA (Huntsman). Such melamine resins may include a paraffin wax such as component (B).

Water and/or Organic Solvent

According to the invention, the composition is based on water and/or an organic solvent.

The term "based on water and/or an organic solvent" encompasses solutions, emulsions and dispersions of the solid and/or liquid compounds contained in the composition in water and/or an organic solvent. The terms "solutions", "emulsions" and "dispersions" are used interchangeably.

The term "water" encompasses distilled water as well as pipe water.

The term "organic solvent" preferably encompasses solvents which are miscible with water or partially water soluble. Preferred organic water miscible solvents are $C_{1-2}$ alcohols, glycols such as ethylene glycol and propylene glycol, dipropylene glycol or polyethylene glycols, amides such as N-methylformamide and N,N-dimethylformamide. Partially water soluble solvents are also suitable. Preferred organic solvents are dipropylene glycol dimethylether, methoxy propyl acetate, methoxy butyl acetate (butoxyl), and methoxy methyl butyl acetate.

Preferably, the composition is mainly based on water. The term "mainly" means that the amount of organic solvent is less than 50% by weight, based on the total weight of water and organic solvent (=100% by weight). In a preferred embodiment, the amount of organic solvent is less than 40% by weight; more preferred less than 30% by weight, still more preferred less than 20% by weight, still more preferred less than 10% by weight. In one embodiment, the composition does not contain an organic solvent.

The composition according to the invention may contain form 0.1 to 90% by weight water and/or an organic solvent based on the total amount of the composition (=100% by weight).

In one embodiment, the composition comprises from 5-90% by weight of (A); from 5-90% by weight of (B); from 0-40% by weight of (0); from 0-40% by weight of (D); from 0-40% by weight of (E); and from 0.1-90% by weight of water and/or an organic solvent, based on the total amount of the composition (=100% by weight).

In one embodiment, the solids content of an aqueous composition according to the invention is in the range of from 10 to 50% by weight, preferably 20 to 40% by weight and still more preferred 25 to 35% by weight, based on the total weight of the composition (=100% by weight).

Fluorine-Free

The term "fluorine-free" means that the composition is made from components which do not contain fluorine.

Furthermore, in one embodiment, in order to provide a composition being not harmful to the environment as far as possible, the composition according to the invention does not contain one or more of the following compounds which frequently are used for imparting water-repellence to a substrate: N-methylol compounds such as N-methylol acrylic amides or melamine resins bearing N-methylol groups since N-methylol compounds have the disadvantage that they can release formaldehyde in undesirable amounts in the ambient atmosphere, especially at elevated temperatures; chlorine-containing products in particular stemming from monomers such as vinyl chloride or vinylidene dichloride which frequently are used to prepare water-repellent compositions.

Accordingly, in a preferred embodiment, the composition according to the invention does not contain compounds having N-methylol groups or chlorine groups.

Components (A) to (E) are known in the art or may be prepared according to known methods.

Second Aspect: Preparation of the Composition According to the Invention

The composition according to the invention may be prepared by polymerizing monomers (M1) and (M2) and optionally (M3) in water and/or an organic solvent and admixing component (B). Said polymerization may also be conducted in the presence of component (B). If desired, one or more of further components (C) to (E) that are known as components of textile treatment compositions, may be added, preferably after the polymerization has been terminated.

In a preferred embodiment, the composition according to the invention may be prepared by polymerizing monomers (M1) and (M2) and optionally (M3) in water and/or an organic solvent in the presence of component (B). If desired, one or more of further components (C) to (E) which are known as components of textile treatment compositions, may be added, preferably after the polymerization has been terminated.

In a preferred embodiment, prior to polymerization, a mixture of (M1) and (M2) and optionally (M3) and component (B) in water and/or an organic solvent is homogenized. This method is exemplarily explained below:

The wax (component (B)) and monomers (M1) and (M2) and optional monomer (M3) are melted, preferably in the presence of a dispersant (as component (F)). The obtained mixture is dispersed in hot water, e.g. hot water at 85° C., by stirring, e.g. using a Turrax for example. This is followed by high-pressure homogenizing, for example at 400 bar and a temperature of from 80 to 85° C. For this, the obtained heated mixture may be passed through a nozzle or an orifice of a homogenizer. Suitable devices are known in the art. Subsequent to the homogenizing, the dispersion may be cooled down and a polymerization catalyst is added, preferably dispersed or dissolved in water: The dispersion may also be polymerized at elevated temperature such as 80° C. After several hours reaction time at e.g. 50° C. to 80° C., the polymerization is terminated.

Suitable dispersants (component (F)) are known and can be selected from commercially available products such as nonionic surfactants, ethoxylated products, such as ethoxylated alcohols or ethoxylated carboxylic acids. Commercially available cationic-active products may be quaternary ammonium salts or mixtures with such cationic-active products and nonionic products such as mono- or dipropylene glycol. Further suitable dispersants are compounds with amphoteric structures e.g. with betaine and/or amine N-oxide functionalities.

The composition according to the invention preferably contains from 0.1 to 3% by weight, preferably from 0.5 to 3% by weight of dispersant or dispersant mixture based on the total amount of the composition (=100% by weight).

Usually, the copolymerization is carried as free-radical copolymerization by using a polymerization catalyst. As catalysts for the radical polymerizations generally known commercial products are used, which serve as free-radical initiators. In the present invention, inter alia, azo compounds may be used as catalysts. A suitable catalyst is e.g. 2,2'-azobis(2-amidinopropane)dihydrochloride.

The amount of polymerization catalyst employed may be in the range of from 0.1 to 5% by weight, based on the mixture of the monomer (M1) and (M2) and optionally (M3) (=100% by weight), preferably 2.5 to 5% by weight.

Accordingly, the invention relates to a method of making a composition as defined in the first aspect, comprising:
(C1) homogenizing a mixture comprising at least monomers (M1) and (M2) and optionally (M3), and component (B), and water and/or an organic solvent;
(C2) polymerizing the mixture obtained in step (C1).

Preferably, homogenization is performed at a pressure in the range of from 100 to 1,000 bars and a temperature in the range of from 50 to 100° C., preferably by passing the mixture through a nozzle or an orifice.

Preferably, homogenization is performed at a pressure in the range of from 200 to 600 bars and a temperature in the range of from 60 to 90° C.

Suitable homogenizers are known in the art.

Third Aspect. Use of the Composition According to the Invention

The compositions according to the invention are particularly useful for imparting water-repellency to a substrate.

The term "water-repellency" defines the characteristic of a fiber, yarn or fabric to resist wetting as is defined in AATCC Test Method 11-2010.

Accordingly, the invention relates to a method of treating a substrate comprising at least step (S1):
(S1) contacting a substrate with the composition defined in the first aspect, or made according to the method defined in the second aspect.

The term "treating a substrate" encompasses terms such as "finishing a substrate", "imparting hydrophobicity to a substrate", "making a substrate water-repellent", "making a substrate dirt resistant" or "coating a substrate".

The contacting of the substrate may be carried out by generally customary methods, such as dunking or dipping the substrate into the composition according to the invention, or by spraying the composition according to the invention onto a substrate, or by brush application or sponge application or via a forced application or by an extraction method. Subsequent to the contacting, the contacted substrate may be dried, and, where appropriate, cured at temperatures in the range of from 140° C. to 190° C. Excellent performance is also achievable at low or even ambient curing conditions, means at temperatures below 100° C. or even at temperatures as low as 50° C.

Preferably, the substrate is a textile, fiber, fabric, paper, nonwoven, leather, or a combination of two or more thereof.

The textiles are preferably made from cotton, polyester, or a cotton/polyester blend, from polyamides, polyimides, polyphenylene sulfide, aramide, polyvinyl chloride, polyacrylnitrile, polyvinyl acetate, polytetrafluoroethylene, polyethylene, polypropylene, polyurethane, elastane, carbon fibers, silicate fibers, glas fibers, basalt fibers, metal fibers, or mixtures of two or more thereof. The textiles are normally wovens, knits or non-wovens.

Accordingly, in general, the composition according to the invention may be used as a finish or finishing for substrates such as textile fabric. Preferably, the substrates are provided in the form of a linear, a planar formation or a spatial formation.

The term "finish or finishing" encompasses a composition by means of which water-repellency may be imparted to a substrate. The finishing may be applied to the substrate before or after washing the substrate.

In one embodiment, the composition according to the invention may be used in or as finishing for any textile (=substrate). The textile may be in the form of a linear formation such as threads and yarns, in the form of a planar formation such as fabric, knitted fabric, knotted fabric, non-woven fabric, felts, and in the form of a spatial formation such as hoses and outwear for women, men and children.

In one embodiment, the invention relates to the use of a wax which comprises or consists of a n-paraffin in an amount of from 75 to 95% by weight and an isoparaffin, and/or a cycloparaffin and/or an aromatic compound in an amount of from 5 to 25% by weight based on the total amount of the wax, wherein the n-paraffin has from 20 to 60 carbon atoms, preferably wherein the n-paraffin has a molecular weight of from 300 to 600, in or as a finishing for substrates such as textile fabric. Preferably, the substrates are provided in the form of a linear, a planar formation or a spatial formation.

The terms "linear formations", "planar formations" and "spatial formations" are known in the textile industry The composition according to the invention may also be applied as finishing for outwear to be washed.

In a fourth aspect, the invention relates to a substrate comprising at least components (A) and (B) as defined in the first aspect.

In one embodiment, said substrate is or has been treated by the method as defined in the third aspect.

EXAMPLES

Examples #1 to #9: Preparation of Compositions According to the Invention 5 g of t-butylmethacrylate and 15 g of stearylacrylate were added to a hot mixture of 4.8 g Genapol ID 100 (fatty alcohol ethoxylate (Clariant)) and 0.4 g of cetyltrimethylammonium chloride in 10 g dipropylene glycol and 120 g water at appr. 80° C. are dispersed by stirring. In a separate vessel, 40 g of the paraffin wax (melting range 68-74° C.) were melted. The above described dispersion of monomers was added to the molten paraffin wax. After 2 minutes of further dispersing the mixture was two times consequently homogenized by Manton-Gaulin homogenizer equipment (at 400 bars at 85° C.) until a stable emulsion was obtained. The temperature was kept between 75-80° C., and 0.2 g 2,2'-azobis(2-methylpropionamidine)dihydrochloride initiator (Wako V-50) diluted in 1.8 g water was added and the mixture was treated for 6 hours at 75° C. under $N_2$ under a donned reflux condenser. This resulted in appr. 200 g product having an active content of appr. 33% by weight (determined by drying at 120° C./2 h).

Similar to the process described for Example #1 other monomer combination and paraffin wax types were used to produce stable dispersions. Details are given in Table 1:

TABLE 1

|  | #1 | #2 | #3 | #4 | #5 | #6 | #7 | #8 | #9 |
|---|---|---|---|---|---|---|---|---|---|
| t-BuMA | 2.5 |  | 1.5 |  |  |  | 2.5 | 1 | 2.5 |
| i-BuMA |  |  |  | 1 |  |  |  |  |  |
| MMA | — | 2.5 |  |  | 2.5 |  |  |  |  |
| HexAC | — |  |  |  |  | 4 |  |  |  |
| SA | 7.5 |  | 8.5 |  | 7.5 | 6.5 | 7.5 |  |  |
| BeMA |  | 10 |  |  |  |  | 5 | 5 | 12.5 |
| LA |  |  |  | 10 |  |  |  |  |  |
| HEMA |  |  | 0.2 |  | 0.2 | 0.1 | 1.0 |  |  |
| GMA |  |  | 0.2 | 0.4 | 0.1 | 0.1 |  | 0.1 |  |
| HBAC |  |  |  |  |  |  |  | 0.1 |  |
| paraffin wax | 20 | 17.5 | 20 | 15 | 20 | 20 | 10 | 25 | 7.5 |

(t-BuMA = tert. Butylmethacrylate; i-BuMA = iso-butylmethacrylate; MMA = methylmethacrylate; HexAC = hexylacrylate; SA = stearylacrylate; BeMA = behenylacrylate; LA = laurylacrylate; HEMA = hydroxyethylmethacrylate; GMA = glycidylmethacrylate; HBAC = hydroxybutylacrylate; paraffin wax: Sasolwax 8775)

Example #10: This Example Describes the Treatment of Textile Fabric with the Dispersions Prepared as Per Examples #1-#9

A woven 100% polyester fabric (100 g/m$^2$) and a woven 100% cotton fabric (200 g/m$^2$) were treated. The cotton fabric was treated in a pad-mangle with a liquor containing 1 g/l acetic acid, 20 g/l of a cellulose crosslinker and 50 g/l and 70 g/l of the dispersions of Examples #1-#9. Typical weight pick-up of the liquor was 80 percent. The polyester fabric was padded with a liquor containing 1 g/l acetic acid, 1 g/l of a wetting agent, and 40 and 60 g/l of dispersion of Examples #1-#9. Typical weight pick-up was 60 percent. After padding, the fabrics were dried at 160° C. for 3 minutes.

The finished fabrics obtained as per Example #10 were subjected to a water spray test as per AATCC 22-2010, ISO 4920 (EN 24920) original and after 10 wash cycles (DIN ISO 6330) at 40° C. After the washing cycles the fabrics were tumble dried before spray testing. Typical tumble drying temperature 60-65° C. for 30 minutes. According to the spray test rating chart, a rating of 100 means no sticking or wetting of the face of the fabric, a rating of 90 means a slight random sticking of wetting of the face of the fabric, a rating of 80 means a wetting of the face of the fabric at spray points, a rating of 70 means partial wetting of the face of the fabric beyond the spray points, and a rating of 50 means a complete wetting of the entire face of the fabric.

Polyester

| Example | #1 | #2 | #3 | #4 | #5 | #6 | #7 | #8 | #9 |
|---|---|---|---|---|---|---|---|---|---|
| Application 40 g/l | | | | | | | | | |
| Initial | 100 | 100 | 100 | 100 | 100 | 100 | 100 | 100 | 90 |
| 10x wash cycles | 90 | 90 | 90 | 80 | 100 | 80 | 80 | 90 | 70 |
| Application 60 g/l | | | | | | | | | |
| Initial | 100 | 100 | 100 | 100 | 100 | 100 | 100 | 100 | 100 |
| 10x wash cycles | 100 | 100 | 90 | 90 | 100 | 90 | 80 | 100 | 80 |

Cotton

| Example | #1 | #2 | #3 | #4 | #5 | #6 | #7 | #8 | #9 |
|---|---|---|---|---|---|---|---|---|---|
| Application 50 g/l | | | | | | | | | |
| Initial | 100 | 100 | 100 | 100 | 100 | 100 | 100 | 100 | 90 |
| 10x wash cycles | 70 | 50 | 70 | 70 | 70 | 50-70 | 70 | 70 | 50 |
| Application 70 g/l | | | | | | | | | |
| Initial | 100 | 100 | 100 | 100 | 100 | 100 | 100 | 100 | 90 |
| 10x wash cycles | 80 | 70 | 80 | 80 | 80 | 70-80 | 80 | 90 | 70 |

The examples show on polyester even at low add-on very good water repellent effects even after washing. For cotton very good initial effects are achieved.

By addition of an additional crosslinker e.g. Cassurit FF the durability of the water repellent effect on polyester, but especially on cotton fabric, can further be improved.

Cotton

| Example | #1 | #2 | #3 | #4 | #5 | #6 | #7 | #8 | #9 |
|---|---|---|---|---|---|---|---|---|---|
| Application 50 g/l + 10 g/l Cassurit FF | | | | | | | | | |
| Initial | 100 | 100 | 100 | 100 | 100 | 100 | 100 | 100 | 90 |
| 10x wash cycles | 80 | 80 | 80-90 | 80-90 | 90 | 80 | 80 | 80 | 70 |
| Application 70 g/l + 10 g/l Cassurit FF | | | | | | | | | |
| Initial | 100 | 100 | 100 | 100 | 100 | 100 | 100 | 100 | 100 |
| 10x wash cycles | 90 | 90 | 100 | 90 | 100 | 80-90 | 90 | 90 | 80 |

Polyester

| Example | #1 | #2 | #3 | #4 | #5 | #6 | #7 | #8 | #9 |
|---|---|---|---|---|---|---|---|---|---|
| Application 40 g/l + 5 g/l Cassurit FF | | | | | | | | | |
| Initial | 100 | 100 | 100 | 100 | 100 | 100 | 100 | 100 | 100 |
| 10x wash cycles | 100 | 100 | 100 | 90 | 100 | 90 | 90 | 100 | 80-90 |

Similar improvement of the durability of the water repellent effect was achieved by adding 20 g/l of a melamine resin formulation (e.g. Cerol EX or Freepel 1225) to the application bath.

Despite the fact that fabrics treated with formulations of Examples #1-#9 offer already a good hand feeling, sometimes it is desirable to give the treated fabric a special extra soft hand feeling. This can be achieved by adding in addition to the application bath a softener formulation based on an organic polysiloxane such as Ceraperm SFC.

Polyester

| Example | #1 | #2 | #3 | #4 | #5 | #6 | #7 | #8 | #9 |
|---|---|---|---|---|---|---|---|---|---|
| Application 40 g/l + 5 g/l Cassurit FF + 15 g/l Ceraperm SFC | | | | | | | | | |
| Initial | 100 | 100 | 100 | 100 | 100 | 100 | 100 | 100 | 100 |
| 10x wash cycles | 90 | 90 | 90 | 80 | 90 | 80 | 80 | 90 | 70-80 |

Besides a very soft comfortable hand feeling, very good initial and durable water repellency is achieved.

The invention claimed is:

1. A composition, comprising at least components (A) and (B) and optionally at least one of components (C) to (E):
   (A) a polyacrylate consisting of moieties derived from monomers (M1), (M2), and optionally (M3) and obtained in the polymerisation of
   (M1) $CH_2=CR^3COO-R^1$ with
   (M2) $CH_2=CR^3COO-R^2$ and optionally
   (M3) $CH_2=CR^3-X-R^4$;
   (B) a wax;
   (C) a blocked isocyanate;
   (D) an organic polysiloxane;
   (E) a melamine resin;
   wherein
   $R^1$ is the alcohol moiety in monomer (M1) containing from 1 to 8 carbon atoms;
   $R^2$ is the alcohol moiety in monomer (M2) containing from 9 to 40 carbon atoms;
   $R^3$ is H, $CH_3$, or $C_2H_5$;
   X is COO or CONH;
   $R^4$ is glycidyl or $CH_2(CH_2)_n-R^5$,
   wherein
   n is an integer in the range of from 1-10 and
   $R^5$ is H or a residue containing from 1 to 6 carbon atoms;
   wherein the composition is based on water and/or an organic solvent and is fluorine-free;
   and wherein the composition comprises from
   5—90 % by weight of (A);
   5—90 % by weight of (B);
   0—40 % by weight of (C);
   0—40 % by weight of (D);
   0—40 % by weight of (E);
   0.1—90 % by weight of water and/or an organic solvent;
   based on the total amount of the composition (=100 % by weight).

2. The composition according to claim 1, wherein $R^1$ contains from 1 to 6 carbon atoms and $R^2$ contains from 12 to 40 carbon atoms.

3. The composition according to claim 1, wherein $R^1$ is branched or unbranched or cyclic $C_1$-$C_6$ alkyl and $R^2$ is branched or unbranched or cyclic $C_{12}$-$C_{40}$ alkyl.

4. The composition according to claim 1, wherein $R^1$ is selected from one or more of the group consisting of methyl, ethyl, n-propyl, iso-propyl, n-butyl, iso-butyl, sec-butyl, tert-butyl, n-pentyl and isomers thereof, n-hexyl and isomers thereof, cyclopropyl, cyclobutyl, cyclopentyl, cyclohexyl; and $R^2$ is selected from one or more of the group consisting of n-dodecyl (lauryl) and isomers thereof, n-tridecyl and isomers thereof, n-tetradecyl (myristyl) and isomers thereof, n-pentadecyl and isomers thereof, n-hexadecyl (cetyl) and isomers thereof, n-heptadecyl and isomers thereof, n-octadecyl (stearyl) and isomers thereof, n-nonadecyl and isomers thereof, n-eicosyl and isomers thereof, n-heneicosyl and isomers thereof, n-docosyl (behenyl) and isomers thereof, n-tricosyl and isomers thereof, n-tetracosyl and isomers thereof, n-pentacosyl and isomers thereof, n-hexacosyl (ceryl) and isomers thereof, n-heptacosyl and isomers thereof, n-octacosyl and isomers thereof, n-nonacosyl and isomers thereof, n-triacontyl (myricyl) and isomers thereof.

5. The composition according to claim 1, wherein (A) is obtained in the polymerization of 5 to 45% by weight of monomer (M1) with 55 to 95% by weight of monomer (M2) based on the total amount of (A) (=100% by weight).

6. The composition according to claim 1, wherein the wax has a melting point in the range of from 50 to 130° C.

7. The composition according to claim 1, wherein the wax is a paraffin wax.

8. The composition according to claim 1, wherein the composition does not contain compounds comprising N-methylol groups or chlorine groups.

9. A method of making the composition of claim 1, comprising at least (C1) to (C2):
   (C1) homogenizing a mixture comprising at least monomers (M1) and (M2), and component (B), and water and/or an organic solvent;
   (C2) polymerizing the mixture obtained in (C1).

10. A method of treating a substrate, comprising at least (S1):
    (S1) contacting a substrate with the composition of claim 1.

11. A substrate comprising the composition of claim 1.

12. The substrate according to claim 11, wherein the substrate is treated by at least (S1):
    (S1) contacting the substrate with the composition.

13. The substrate according to claim 11, wherein the substrate is in the form of a linear formation optionally thread and yarn, in the form of a planar formation optionally fabric, knitted fabric, knotted fabric, non-woven fabric, felt, or in the form of a spatial formation optionally hose and outwear; or wherein the substrate is textile, fiber, fabric, paper, nonwoven, leather, or a combination of two or more thereof.

14. The composition according to claim 1, comprising n-paraffins in an amount of from 75 to 95% by weight and isoparaffins, and/or cycloparaffins and/or aromatic compounds in an amount of from 5 to 25% by weight, based on the total amount of the wax, wherein the n-paraffins have from 20 to 60 carbon atoms, optionally wherein the n-paraffins have a molecular weight of from 300 to 600.

15. The composition according to claim 1, wherein component (C) is present.

16. The composition according to claim 1, wherein component (D) is present.

17. The composition according to claim 1, wherein component (E) is present.

18. The composition according to claim 1, wherein (A) is obtained in the polymerization of 5 to 44% by weight of monomer (M1) with 55 to 94% by weight of monomer (M2) and 0.1 to 20% by weight of (M3) based on the total amount of (A) (=100% by weight).

19. The composition according to claim 1, wherein the wax has a melting point in the range of from 60 to 90° C.

* * * * *